(12) United States Patent
Smiley et al.

(10) Patent No.: US 12,097,730 B2
(45) Date of Patent: *Sep. 24, 2024

(54) FORCE FEEDBACK SYSTEM FOR BEAD EXERCISER

(71) Applicant: INTERNATIONAL WHEEL & TIRE COMPANY, Farmington Hills, MI (US)

(72) Inventors: Keith Martin Smiley, Lake Orion, MI (US); Todd Allen Campbell, LaSalle, MI (US); Daniel Jonathan Ehlke, Detroit, MI (US); Harsh Suresh Shah, Royal Oak, MI (US)

(73) Assignee: INTERNATIONAL WHEEL & TIRE COMPANY, Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,417

(22) Filed: Sep. 16, 2022

(65) Prior Publication Data

US 2023/0019447 A1 Jan. 19, 2023

Related U.S. Application Data

(63) Continuation of application No. 16/808,016, filed on Mar. 3, 2020, now Pat. No. 11,446,971.

(51) Int. Cl.
*B60C 25/05* (2006.01)
*B60C 25/138* (2006.01)

(52) U.S. Cl.
CPC ........ *B60C 25/056* (2013.01); *B60C 25/0515* (2013.01); *B60C 25/138* (2013.01)

(58) Field of Classification Search
CPC . B60C 25/056; B60C 25/0515; B60C 25/138; G01M 17/02
See application file for complete search history.

(56) References Cited

U.S. PATENT DOCUMENTS

| | | | | |
|---|---|---|---|---|
| 6,581,463 | B1 * | 6/2003 | Colarelli, III | G01M 1/326 73/460 |
| 8,250,915 | B1 * | 8/2012 | Voeller | B60C 25/056 73/66 |
| 8,613,303 | B1 * | 12/2013 | Hanneken | B60C 25/056 157/1.24 |
| 8,770,022 | B2 * | 7/2014 | Douglas | G01M 1/16 73/460 |
| 8,770,254 | B1 | 7/2014 | Hanneken et al. | |

(Continued)

FOREIGN PATENT DOCUMENTS

| JP | S5634510 A | 4/1981 |
|---|---|---|
| JP | H10217725 A | 8/1998 |
| WO | 2014103485 A1 | 7/2017 |

*Primary Examiner* — David B. Thomas
(74) *Attorney, Agent, or Firm* — Brooks Kushman, P.C.

(57) ABSTRACT

A bead exerciser system for an automated wheel assembly may include a center lift configured to lift a wheel assembly off of a conveyor belt, a drum roller configured to rotate the wheel assembly, a pair of pinch rollers driven by a driver and configured to apply force to a tire of the wheel assembly, a force sensor configured to detect a force of the tire against the pinch rollers, and a controller configured to receive the force from the force sensor and generate a command for an alert in response to the force falling outside of a predefined threshold range.

18 Claims, 6 Drawing Sheets

(56) References Cited

U.S. PATENT DOCUMENTS

| | | | |
|---|---|---|---|
| 8,776,858 B2* | 7/2014 | Corghi | B60C 25/056 |
| | | | 157/1.1 |
| 8,783,326 B1* | 7/2014 | Vaninger | B60C 25/0551 |
| | | | 157/1.24 |
| 8,904,863 B1* | 12/2014 | Voeller | B60C 25/138 |
| | | | 73/66 |
| 8,985,178 B1* | 3/2015 | Vaninger | B60C 25/056 |
| | | | 157/1.1 |
| 9,073,394 B1* | 7/2015 | Clasquin | B60C 25/056 |
| 9,434,219 B1* | 9/2016 | Clasquin | B60C 25/02 |
| 9,645,037 B2* | 5/2017 | Meyer | G01M 1/00 |
| 9,662,945 B2* | 5/2017 | Molbach | B60C 25/0515 |
| 9,731,566 B1* | 8/2017 | Voeller | B60C 25/056 |
| 9,834,046 B2* | 12/2017 | Nicolini | B60C 25/138 |
| 10,071,607 B2* | 9/2018 | Corghi | B60C 25/14 |
| 10,620,606 B2* | 4/2020 | Sotgiu | B60C 25/00 |
| 10,906,364 B2* | 2/2021 | Gonzaga | B60C 25/135 |
| 11,446,971 B2* | 9/2022 | Smiley | B60C 25/056 |
| 2010/0163189 A1 | 7/2010 | Lawson | |
| 2011/0100558 A1* | 5/2011 | Corghi | B60C 25/056 |
| | | | 157/1.1 |
| 2014/0223741 A1* | 8/2014 | Corghi | B60C 25/14 |
| | | | 29/894.31 |
| 2015/0096692 A1* | 4/2015 | Molbach | B60C 25/0515 |
| | | | 157/1.17 |
| 2015/0298514 A1* | 10/2015 | Nicolini | B60C 25/138 |
| | | | 157/1.24 |
| 2018/0356784 A1* | 12/2018 | Sotgiu | G05B 19/048 |
| 2019/0030968 A1 | 1/2019 | Gonzaga et al. | |
| 2019/0255894 A1 | 8/2019 | Liebetreu et al. | |

* cited by examiner

FIG. 6

FORCE FEEDBACK SYSTEM FOR BEAD EXERCISER

CROSS-REFERENCE TO RELATED APPLICATIONS

This application is a continuation of U.S. application Ser. No. 16/808,016 filed Mar. 3, 2020, now U.S. Pat. No. 11,446,971, issued Sep. 20, 2022, the disclosure of which is hereby incorporated in its entirety by reference herein.

TECHNICAL FIELD

The present disclosure relates generally to wheel/tire assemblies and more specifically to a robotic bead exerciser system for a wheel/tire assembly process.

BACKGROUND

Machines, assembly lines, and robots are used for tire and wheel manufacturing and assembly. These machines may automate tire assembly processes, increasing efficiencies and lowering costs. In addition to assembling tires, the machines may also perform certain calibrations, tests, and verifications.

SUMMARY

A bead exerciser system for an automated wheel assembly may include a center lift configured to lift a wheel assembly off of a conveyor belt, a drum roller configured to rotate the wheel assembly, a pair of pinch rollers driven by an actuator and configured to apply force to a tire of the wheel assembly, a feedback component configured to detect a force of the tire against the pinch rollers, and a controller configured to receive the force from the force sensor and generate a command for an alert in response to the force falling outside of a predefined threshold range A bead exerciser system for an automated wheel assembly may include a drum roller configured to rotate a wheel assembly; a pair of pinch rollers arranged on an opposite side of the wheel assembly than the drum roller, the pinch rollers driven by a driver and configured to apply force to a tire of the wheel assembly; and a controller configured to determine a force from actuator data received from the driver and generate a command for an alert in response to the force falling outside of a predefined threshold range.

A method for validating a force of a bead exerciser system may include receiving actuator data from a driver configured to vertically move a pair of pinch rollers; determining a force of the pinch rollers based on the actuator data; determining whether the force is within a predefined threshold range; and instructing an alert in response to the force not being within the predefined threshold range.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 6 illustrates an example screen of the bead exerciser system of FIG. 1.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a robotic bead exerciser system included as part of a conveyor system for wheel and tire assembly. The bead exerciser system may be a pre-balance system where the wheel is automatically fed into a bead exerciser station. The station may then simulate a load around the bead of the tire via pinch rollers. A controller may transmit data indicative of a force applied at the tire by the exerciser station. The controller may then determine whether the force is appropriate for the wheel and tire assembly and provide feedback to the operator when appropriate to do so. The controller may also instruct the assembly to cease the process in order to avoid damaging of the parts or the exerciser station.

Figure 1:
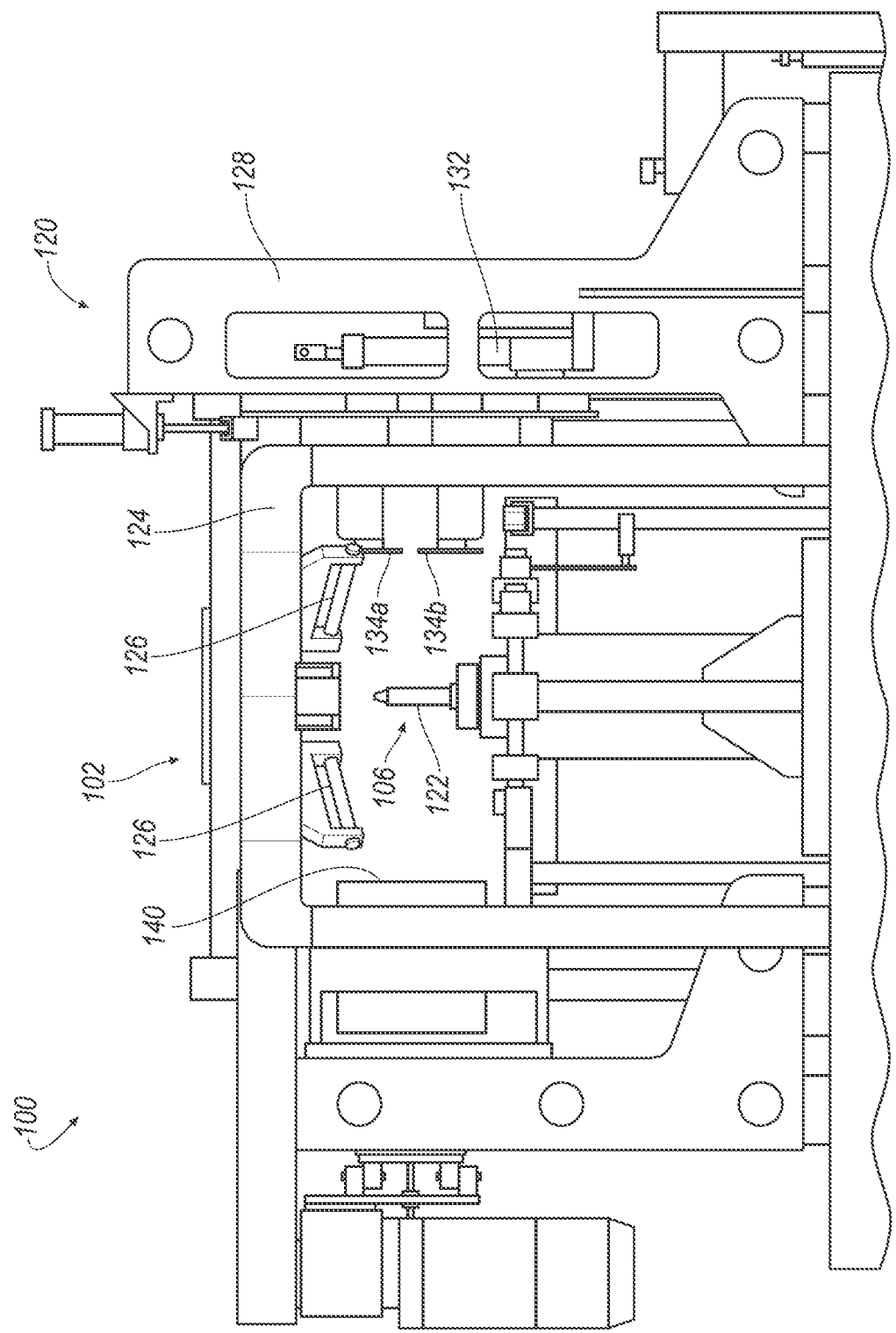
FIG. 1 illustrates a back elevational view of a bead exerciser system.
Figure 2:
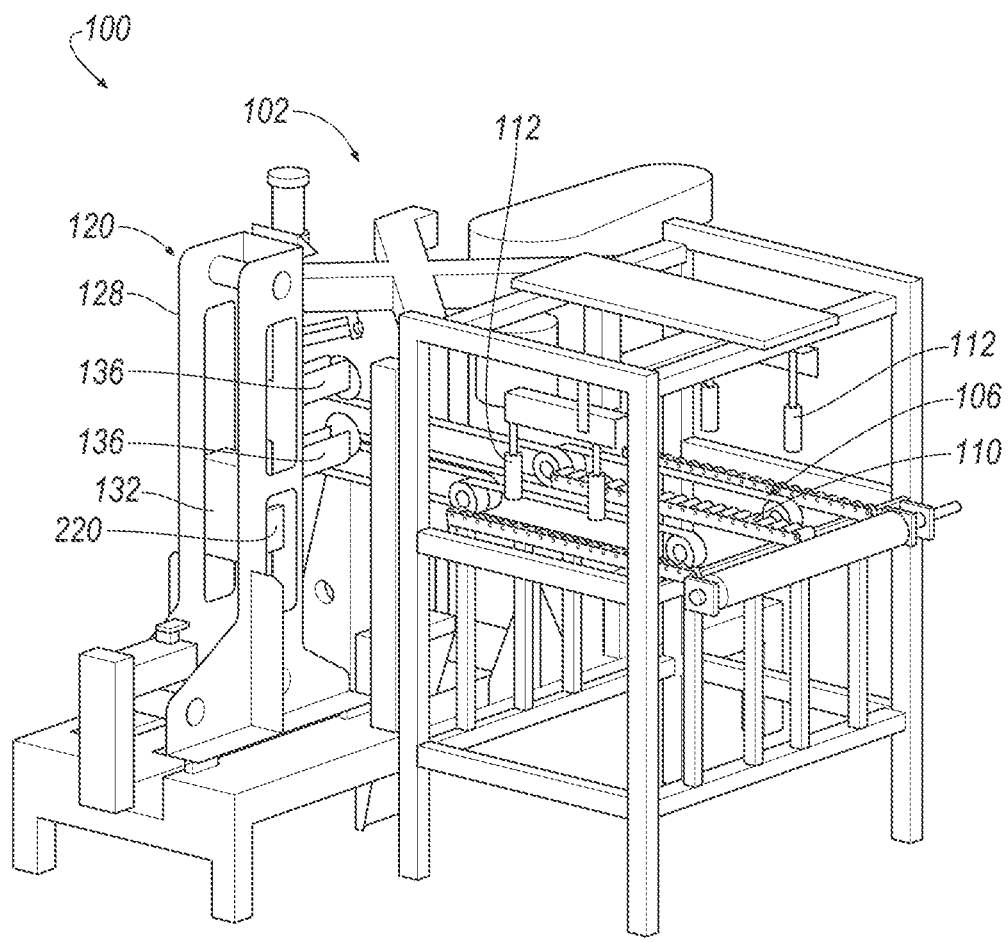
FIG. 2 illustrates an isometric view of the bead exerciser system of FIG. 1.
Figure 3:
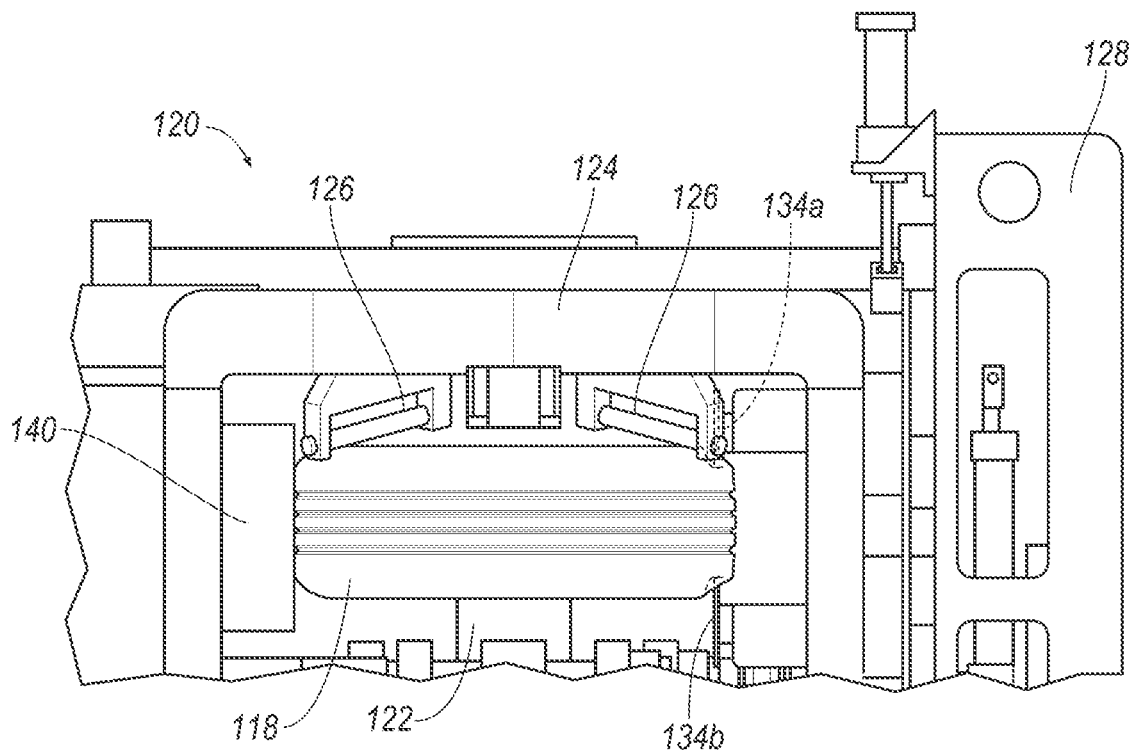
FIG. 3 illustrates a back zoomed in view of the bead exerciser of system of FIG. 1.

FIG. 1 illustrates a back view of a bead exerciser system 100. FIG. 2 illustrates an isometric view of the bead exerciser system 100. FIG. 3 illustrates a back zoomed in view of the bead exerciser system 100. During wheel assembly, a wheel and tire assembly (not shown in FIG. 1, also referred to herein as wheel assembly 118 and shown in FIG. 3) may be automatically fed into a bead exerciser station 102 via a conveyor 110. The conveyor 110 may be a free rolling conveyor, and may include a belt configured to lift the wheel assembly 118 off of the free rolling conveyor, or both.

In one example embodiment, at least one centering arm 112 may be arranged on either side of the conveyor 110. In the example shown in FIG. 2, each centering arm 112 includes a pair of centering arms 112. The centering arms 112 may, but not necessarily are required to, aid in centering the wheel assembly 118 on the conveyor 110 and may open and close around the wheel assembly 118 in order to center or align the wheel assembly on the conveyor 110. The bead exerciser assembly 120 may include a centering station 106 configured to center the wheel assembly 118 on the conveyor 110.

The conveyor 110 may include at least one conveying apparatus configured to move the wheel assembly 118 thereon from the centering station 106 to bead exerciser assembly 120. The bead exerciser assembly 120 may include a lift cylinder 122. The lift cylinder 122 may be arranged proximal to a bead exerciser assembly 120 at a distal portion of the conveyor 110. During use, the lift cylinder 122 may be configured to move vertically from a first fixed position below the conveyor 110 to a second fixed position extending through and above the conveyor. The lift cylinder 122 is configured to engage with the wheel assembly 118 at the wheel and lift the wheel assembly 118 off of the conveyor 110. The cylinder 122 may engage with the bore of the wheel. The lift cylinder 122 may also center the wheel assembly 118 and align the wheel assembly 118 relative to the bead exerciser assembly 120.

During operation the wheel assembly 118 may proceed along the conveyor 110 and once the wheel assembly is arranged at or proximal to the bead exerciser assembly 120, the lift cylinder 122 may extend upward from a resting position below the conveyor 110 to engage with the wheel and elevate the wheel assembly 118 above the conveyor. The system 100 may include at least one top roller 126 arranged on an upper support 124 of the system 100. The lift cylinder 122 may raise the wheel assembly 118 to abut the at least one top roller 126. In the example shown in the Figures, the top roller 126 includes a pair of top rollers 126.

The bead exerciser assembly 120 may be arranged at one side of the system 100 and include a support 128. The support 128 may be configured to house at least one actuator 132. The exerciser assembly 120 may include a pair of pinch rollers 134, including a top pinch roller 134a and a bottom pinch roller 134b, each arranged on a respective arm 136 and extending perpendicularly outward from the support 128. The pinch rollers 134 may be rotatable discs configured to engage the tire beads of the wheel assembly. The arms 136 may be attached to the actuator 132 and may be movable in the vertical direction in order to 'pinch' the tire.

The actuator 132 may be any type of actuator configured to move the arms 136 of the bead exerciser assembly 120. The actuator 132, for example, may be a linear actuator, such as an EDRIVE, ball-screw, cylinder. The actuator 132 may include a motor, such as a servo motor, to apply torque. The actuator 132 may be configured to vertically adjust each of the arms 136 holding the pinch rollers 134. The arms 136 may adjust the position of the pinch rollers 134 and therefore adjust the hold or force applied by the pinch rollers 134 to the tire. A top pinch roller 134a may make contact with the top of the tire, while a bottom pinch roller 134b may make contact with the bottom of the tire. In one example, the contact may be approximately 19-25 mm from the edge of the wheel. The pinch rollers 134 may engage the tire and 'pinch' the tire. In one example, the pinch rollers 134 may extend into the tire approximately 12 mm. The pinch rollers 134 may move in tandem in that each laterally move at the same rate and distance. In another example, one of the pinch rollers 134 may move while the other remains stationary.

In the examples described herein, the pinch rollers 134 may move together. That is, the pinch rollers 134 may be arranged at opposite ends of the same actuator 132. However, each pinch roller 134 may also move independent of the other and be arranged on separate actuators.

A drum roller 140 may be arranged on an opposite side of the system 100 of the bead exerciser assembly 120. The drum roller 140 may be configured to move horizontally from a first resting position to a second engage position where the roller 140 engaged with the tire of the wheel assembly. The drum roller 140 may rotate, and once in contact with the tire, may cause the wheel assembly 118 to rotate or spin about the lift cylinder 122, prior to the wheel assembly engaging or coming into contact with the pinch rollers 134. The lift cylinder assembly may include at least one bearing to allow for rotation of the wheel assembly.

The drum roller 140 may spin the wheel assembly 118 concurrent with the pinch rollers 134 applying pressure at or near the tire beads. Air nozzles (not specifically labeled), may blow air onto the wheel assembly, aiding to clean any excessive soap or debris from the assembly.

The bead exerciser assembly 120 may include a controller 130. The controller 130 may be stand-alone controller specific for the bead exerciser assembly 120, or may be a general controller for the general wheel assembly. The controller 130 may include one or more processors configured to perform instructions, commands and other routines in support of the processes described herein. Such instructions and other data may be maintained in a non-volatile manner using a variety of types of computer-readable storage medium. The computer-readable medium (also referred to as a processor-readable medium or storage) includes any non-transitory medium (e.g., a tangible medium) that participates in providing instructions or other data that may be read by the controller 130 or processor. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, Ladder Logic, and PL/SQL. The system may specifically implement and use a combination of TP programming (Teach Pendant programming) and Karel.

Figure 6:
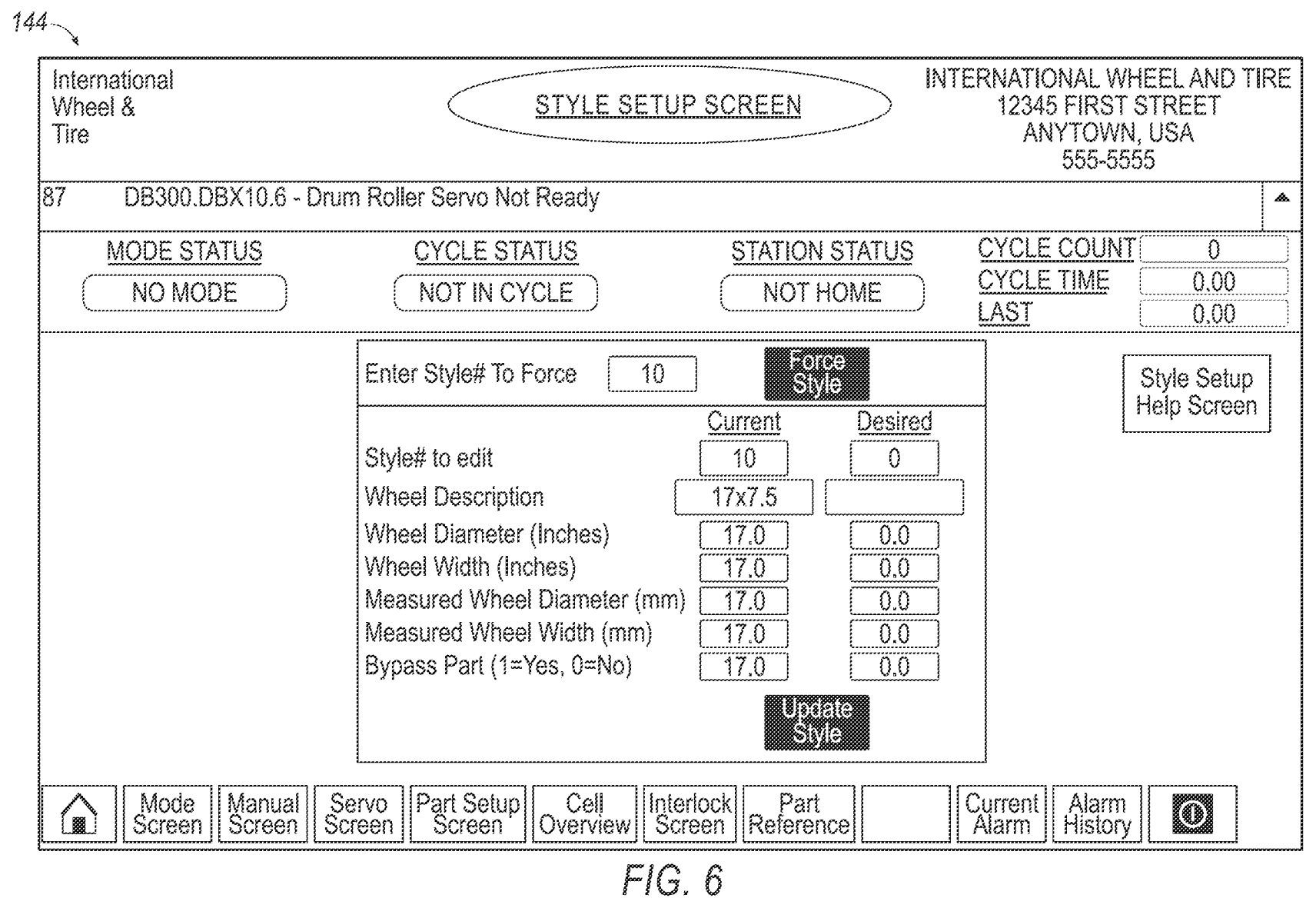

The controller 130 may be configured to control operation of the components of the bead exerciser system 100. For example, the controller 130 may be configured to provide instructions to the conveyor 110, lift cylinder 122, drum roller 140, pinch rollers 134, actuator 132, etc. The controller 130 may be in communication with these components, among others, including display 144. The display 144 may be a human machine interface (HMI) configured to receive commands from system operators. The display 144 may also be configured to display data relevant to the operation of the system 100. In one example, the display 144 may display alerts, provide feedback to the operators, etc. The display 144 may be a touchscreen configured to receive input, as well as include other buttons and controls. The display 144 may provide images, text, etc., to the operator and may be made of light emitting diodes (LEDs), liquid crystal displays, etc. An example display screen is illustrated in FIG. 6.

The actuator 132 may be configured to transmit actuator data to the controller 130. The actuator data may include feedback data regarding the state of the driver. This data may include linear position of the driver and arms 136, force data, pressure, current, torque of the driver motor, etc. The controller 130 may use this data to determine certain characteristics of the system 100, include status, verifications, etc. Specifically, the controller 130 may determine a force being applied at the wheel beads by the pinch rollers 134. The actuator data may include one or more of the above example data metrics. This may especially be the case in the event that multiple sensors are present, or more than one type of sensor.

The controller 130 may determine the force based on the data supplied from the actuator 132. In one example, the servo motor torque of the actuator 132 may be used to calculate the force. In another example, the actuator 132 may supply a force to the controller from a force sensor 142. The force sensor 142 may detect a resistive load applied at the pinch rollers 134 and output that resistance to the controller 130. The controller 130 may determine, based on this resistance and state of the actuator 132, the applied force of the pinch rollers 134. The force sensor 142, may include an electric force sensing resistor, or torque sensor, or any device capable of detecting or determining a force. In the example where a current sensor may measure the current of the servo motor. The current may be used to determine the force. More than one sensor, or type of sensor may be included. For example, the system 100 may include both a force sensor 142 and the current sensor. The controller 130 may determine the force based on data supplied by both sensors. In this example, a first force may be determined from a first set of data received from the force sensor 142 and a second force may be determined from a second set of data received from the current sensor. The first and second forces may then be averaged to determine the force.

Upon determining the force, the controller 130 may then use the calculated force to verify the tire status based on the exercising of the tire beads. The verification may alert operators of the system 100 of potential operating issues with the system 100, or quality issues with the wheel assembly.

The controller 130 may interface with memory 133 to verify and check the actuator data. For example, the memory 133 may maintain a look-up table configured to maintain various thresholds. The thresholds may include the predefined thresholds, such as predefined forces, positions, distances, etc. The thresholds may be specific to a wheel assembly 118 size, type, make, model, etc. The thresholds may be applied in response to the specific tire attributes being recognized, or by operator input at the display 144. The thresholds may also be continually updated based on new data, inputs, etc. For example, during a set up phase, the threshold for force may be initially set by an initial actuator data indicating a pinch force of a test tire. This is described in greater detail below with respect to FIG. 7.

In one example, the actuator 132 may supply the actuator data to the controller 130 indicating a force and a driver position. The driver position may indicate the location of the arms 136. The controller 130 may evaluate the actuator data by comparing the location of the arms with an expected force. If the received force is not within a range of the expected force, the controller 130 may recognize an issue with the tire. For example, if the received force is lower than a lower threshold, than the controller 130 may determine that the tire is deflated. If the received force is higher than a higher threshold, than the controller 130 may determine that the tire is over inflated. This is just one example of wheel assembly verification. The controller 130 may also determine that the wrong wheel assembly 118 has been loaded at the conveyor 110.

Figure 4:
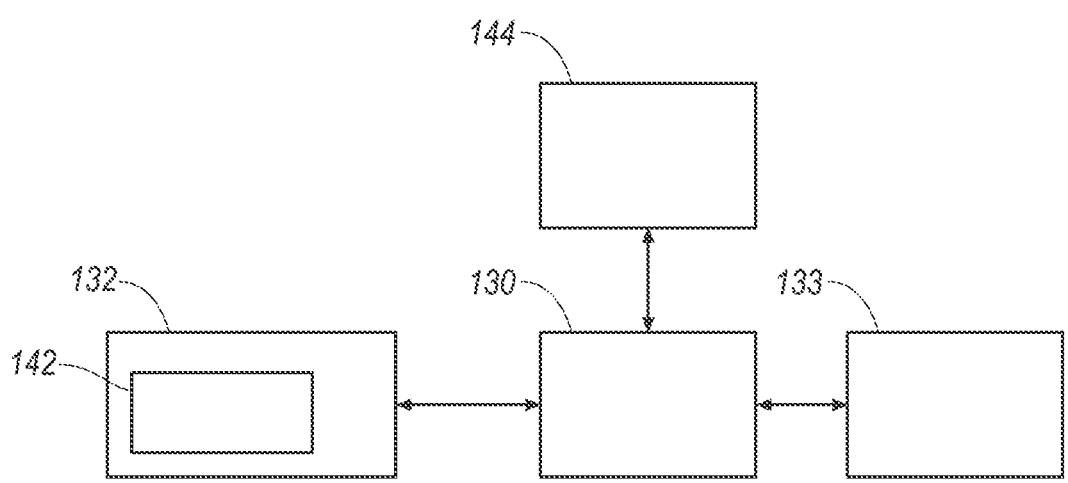
FIG. 4 illustrates a block diagram of a portion of the bead exerciser system of FIG. 1, including a driver, controller and display.

FIG. 4 illustrates a block diagram of a portion of the bead exerciser system 100 including the actuator 132, controller 130 and display 144. The actuator 132, as explained, may include a force sensor 148. The force sensor 148 may be configured to detect a 'pinch' force of the pinch rollers 134. The controller 130 may receive the actuator data, including driver position and force, from the actuator 132 and use the actuator data to verify the current wheel assembly 118. The controller 130 may compare the actuator data to expected thresholds, may calculate a force of the pinch rollers 146, and verify that the drive data is a position within a predefined threshold. That is, at a specific pinch roller distance D or position of the pinch rollers, a certain force is expected. If the controller 130 detects a discrepancy with the data where the drive data or calculated force falls outside of the predefined threshold for a certain position, the controller 130 may transmit a command to the display 144 to indicate an alert. For example, the alert could be "force exceeding limit," "force below limit," "cease operation," "low tire pressure," "wrong part", etc.

Figure 5:
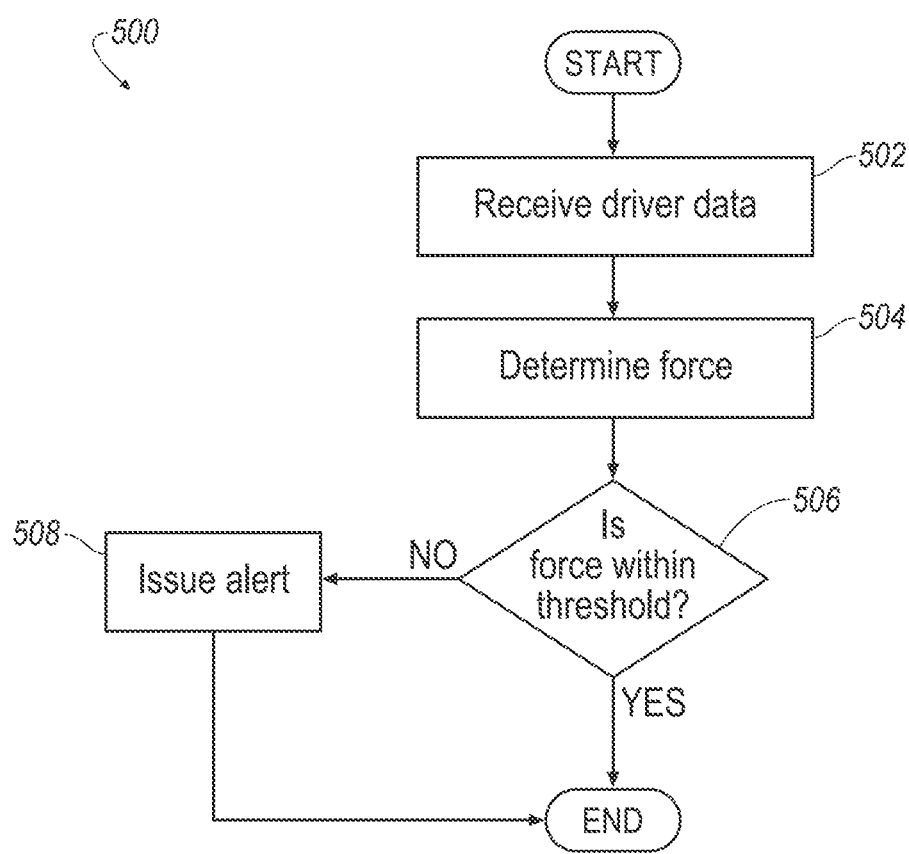
FIG. 5 illustrates an example flow chart for the bead exerciser system.

FIG. 5 illustrates an example flow chart for the bead exerciser system 100. The process 500 begins at block 502 where the controller 130 receives the actuator data from the actuator 132.

At block 504, the controller 130 receives or determines the pinch force. As explained above, the pinch force may be calculated based on a resistance and known position of the arms 136. The pinch force may also be received as part of the actuator data from the force sensor 148 within the driver.

At block 506, the controller 130 may determine whether the force is within a predefined threshold. As explained above, the predefined threshold may include more than one threshold and may be associated with a specific tire size, assembly type, etc. The thresholds may be predetermined, but updated, via a look up table. If the force falls outsides of the threshold, or threshold range, the process proceeds to block 508. If the force is within the threshold, or threshold range, the process 500 proceeds ends.

At block 508, the controller 130 may instruct the display 144 to indicate an alert. As explained, the alert may be commensurate with the type of issue that the data and force may imply. For example, a low force may indicate a low tire pressure. A high force may indicate that the pinch rollers 134 have hit the rim and therefore may be the wrong parts were used or inputted. Once the alert is issued, the process 500 may end.

FIG. 6 illustrates an example screen presented by the display 144. In this example screen, the operator may enter wheel information, such as style number, dimensions, etc. These inputs may be used to determine the predefined thresholds as discussed earlier.

In addition to using force calculations to determine errors, force readings may also be used by the system 100 for iterative assembly learning. For example, certain force calculations may be used to teach offsets for a specific wheel/tire assembly. These offset values may be stored for future use. In one example, the pinch rollers may pinch the wheel/tire assembly until a force threshold is reached. Once the threshold is reached, the value for the distance D between the pinch rollers 134 may be saved with respect to the particular wheel/tire assembly. This value may be saved for future use in this system or others. Other force readings may be used as well to create expected distance thresholds between the pinch rollers, excepted forces at certain pinch roller distances, etc.

Figure 7:
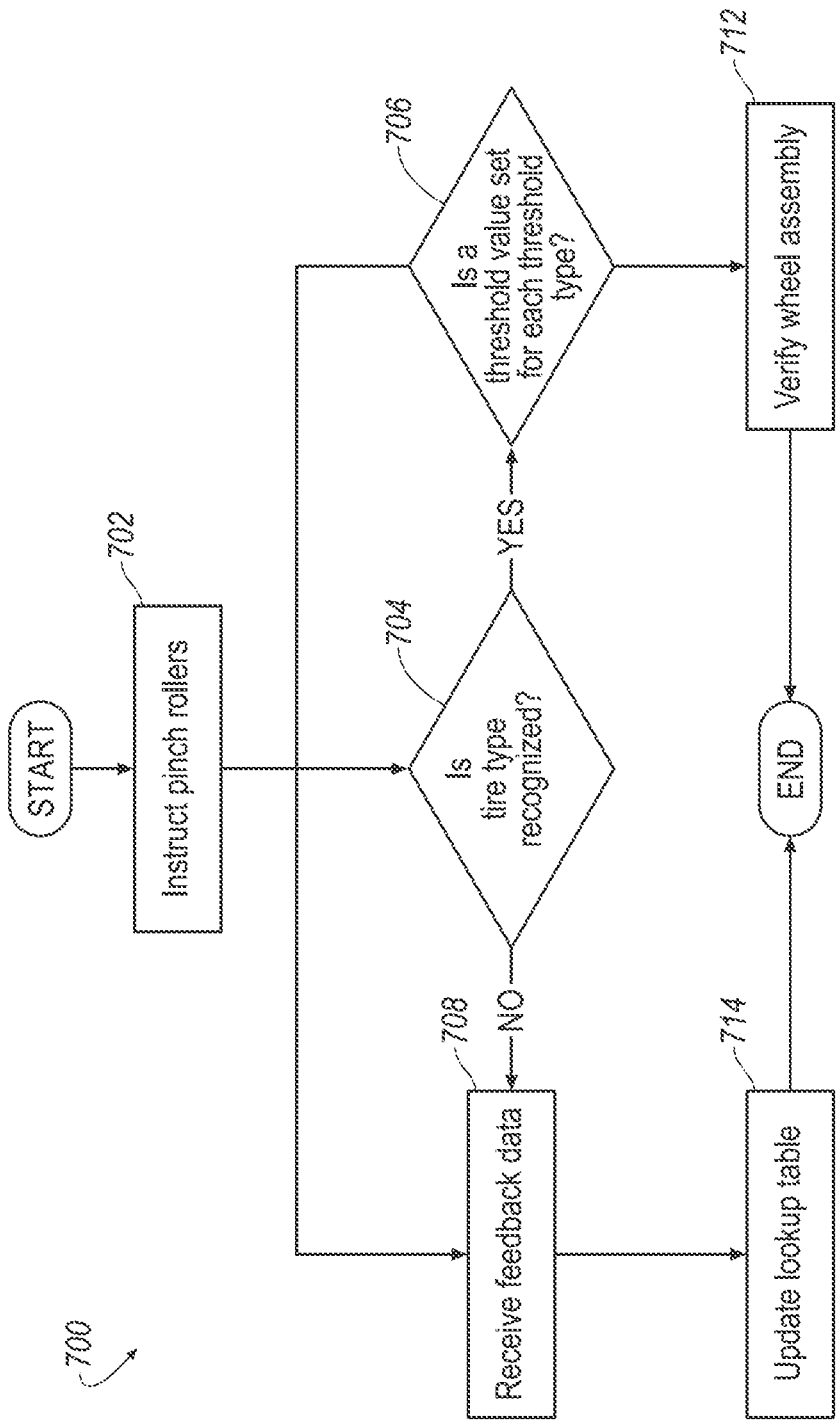
FIG. 7 illustrates an example flow chart for the bead exerciser system.

FIG. 7 illustrates an example flow chart for the bead exerciser system 100 where the system 100 is configured to store and recall certain thresholds. The process 700 begins at block 702 where the controller 130 instructs the pinch rollers 134 to actuate or pinch the tire. This instruction may come from a command at the display 144. The display 144 may also receive an indication of the type or size of wheel assembly. That is, an operator or user may enter certain parameters at the display 144. The controller 130 may in turn instruct the pinch rollers 134 and any other component of the system 100, to act in response to these commands and inputs.

At block 704, the controller 130 may determine whether the tire type is recognized. That is, is the type of tire stored in the memory 133. The tire type may have been stored in the memory 133 previously by user input, a previous operation, etc. The look up tables within the memory may identify the tires by size, type, make, model, etc. If the tire type is recognized, the process proceeds to block 706, if not, the process proceeds to block 708.

At block 706, the controller 130 may determine whether each of the predefined thresholds have been saved with respect to the specific tire. As explained above, the look-up table may be configured to maintain various thresholds. The thresholds may include the predefined thresholds, such as predefined forces, positions, distances, etc. In one example, the tire type may be associated with a force threshold, but not a position threshold. In another example, the tire type may be associated with each of the possible thresholds. That is, the controller 130 may determine whether additional threshold values should be stored with respect to the tire type. If a threshold value is already stored for each of the various thresholds, the process 700 proceeds to block 712. If not, the process proceeds to block 708.

At block 712, the controller 130 may proceed to calibrate and verify the wheel assembly 118 similar to block 506 of FIG. 5.

At block 708, the controller 130 may receive feedback data such as the linear position of the driver and arms 136, force data, pressure, current, torque of the driver motor, etc.

At block 714, the controller 130 may update the lookup table within the memory 133 with threshold values derived from the feedback data. That is, any missing threshold value may be 'filled in' during the verification of a wheel assembly 118 in order to provide a continuously updated database. Furthermore, the controller 130 may recognize trends in the feedback data where the feedback data of a certain tire type reflects a trend that may require one of the stored thresholds be adjusted.

Thus, the thresholds may also be continually updated based on new data, inputs, etc. For example, during a set up phase, the threshold for force may be initially set by an initial actuator data indicating a pinch force of a test tire.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bead exerciser system, comprising:
   at least one roller driven by a driver and configured to apply force to a tire of a wheel assembly;
   a feedback component configured to detect a force of the tire against the at least one roller; and
   a controller configured to receive the force from the feedback component and generate a command for an alert in response to the force falling outside of a predefined threshold range, wherein the alert includes a low tire pressure alert in response to the received force falling below the threshold range.

2. The system of claim 1, wherein the threshold range includes one of an upper threshold and a lower threshold.

3. The system of claim 2, wherein the alert includes a force warning in response to the received force exceeding the upper threshold.

4. The system of claim 1, wherein the feedback component is a torque sensor.

5. The system of claim 1, wherein the controller is further configured to receive actuator data indicative of a position of the at least one roller.

6. The system of claim 5, wherein the controller is further configured to determine the predefined threshold based on the received position of the at least one roller.

7. The system of claim 1, wherein the controller is further configured to cease operating the at least one roller in response to the force falling outside of a predefined threshold range.

8. A bead exerciser system for an automated wheel assembly, comprising:
   a pair of rollers spaced a pinch-roller distance between each other, driven by a driver and configured to apply force to a tire of the wheel assembly;
   a controller configured to
      instruct at least one of the pair of rollers to apply a force until a predefined threshold is reached; and
      store the pinch-roller distance in response to the predefined threshold being reached in a memory.

9. The system of claim 8, wherein the controller is further configured to determine whether a previously stored distance is stored within the memory and update the memory with the pinch-roller distance in response to the determining that a previously stored distance is stored within the memory.

10. The system of claim 9, wherein the controller is further configured to generate a command for an alert in response to the force falling outside of the predefined threshold for the wheel assembly.

11. The system of claim 10, wherein the predefined threshold includes a range defining an upper threshold and a lower threshold.

12. The system of claim 11, wherein the alert includes a low tire pressure alert in response to the force falling below the lower threshold.

13. The system of claim 11, wherein the alert includes force warning in response to the force exceeding the upper threshold.

14. The system of claim 8, wherein the controller is further configured to receive actuator data indicative of a position of the at least one of the pair of rollers.

15. The system of claim 14, wherein the controller is further configured to determine the predefined threshold based on the received position of the at least one of the pair of rollers.

16. A method for validating a force of a bead exerciser system, comprising:
    receiving data from a driver configured to move a roller to create force on a tire;
    determining a force of roller based on the data;
    determining whether the force is within a predefined threshold range; and
    instructing an alert in response to the force not being within the predefined threshold range, wherein the alert includes a low tire pressure alert in response to the force falling below a lower threshold of the range.

17. The method of claim 16, wherein the alert includes a force warning in response to the force exceeding an upper threshold of the range.

18. The method of claim 16, wherein the force is determined based on a force received from a force sensor within the driver.

* * * * *